(12) United States Patent
Dunphy et al.

(10) Patent No.: US 8,031,403 B2
(45) Date of Patent: Oct. 4, 2011

(54) SYSTEM AND METHOD FOR REDUCING VISIBLE SPECKLE IN A PROJECTION VISUAL DISPLAY SYSTEM

(75) Inventors: James C. Dunphy, San Jose, CA (US); Stephen W. Marshall, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 799 days.

(21) Appl. No.: 11/948,881

(22) Filed: Nov. 30, 2007

(65) Prior Publication Data
US 2009/0009871 A1 Jan. 8, 2009

Related U.S. Application Data

(60) Provisional application No. 60/947,640, filed on Jul. 2, 2007.

(51) Int. Cl.
*G02B 5/02* (2006.01)
*G02B 26/00* (2006.01)
*G02B 26/08* (2006.01)
*G03H 1/02* (2006.01)
*G03B 21/14* (2006.01)
*H01J 3/14* (2006.01)

(52) U.S. Cl. ....... 359/599; 359/28; 359/290; 359/199.3; 250/234; 353/20

(58) Field of Classification Search ............ 359/28, 359/290, 199.3, 599; 250/492.9, 234; 353/20; 311/155
See application file for complete search history.

(56) References Cited

U.S. PATENT DOCUMENTS

| | | | |
|---|---|---|---|
| 4,035,068 A | 7/1977 | Rawson | |
| 4,851,978 A * | 7/1989 | Ichihara | 362/268 |
| 5,198,837 A * | 3/1993 | Ikshizaka et al. | 347/256 |
| 5,704,700 A | 1/1998 | Kappel et al. | |
| 7,502,160 B2 * | 3/2009 | Aksyuk et al. | 359/290 |
| 2005/0253055 A1* | 11/2005 | Sprague et al. | 250/234 |
| 2007/0058135 A1* | 3/2007 | Morikawa et al. | 353/30 |
| 2007/0273794 A1* | 11/2007 | Sprague et al. | 348/744 |

OTHER PUBLICATIONS

Rawson, et al.; Speckle-Free Rear-Projection Screen Using Two Close Screens in Slow Relative Motion; Optical Society of America, vol. 66, No. 11, Nov. 1976; pp. 1290-1294.

* cited by examiner

*Primary Examiner* — Georgia Y Epps
*Assistant Examiner* — Magda Cruz
(74) *Attorney, Agent, or Firm* — Charles A. Brill; Wade James Brady, III; Frederick J. Telecky, Jr.

(57) ABSTRACT

The invention provides an apparatus for reducing speckle in a projection visual display (PVD) system, a method of reducing visible speckle in a PVD system and a PVD system incorporating the method or apparatus. In one embodiment, the apparatus includes a diffuser interposable in an optical path of a PVD system and a diffuser actuator having a single drive axis configured to cause the diffuser to travel in a lissajous curve at least partially transverse to the optical path.

9 Claims, 3 Drawing Sheets

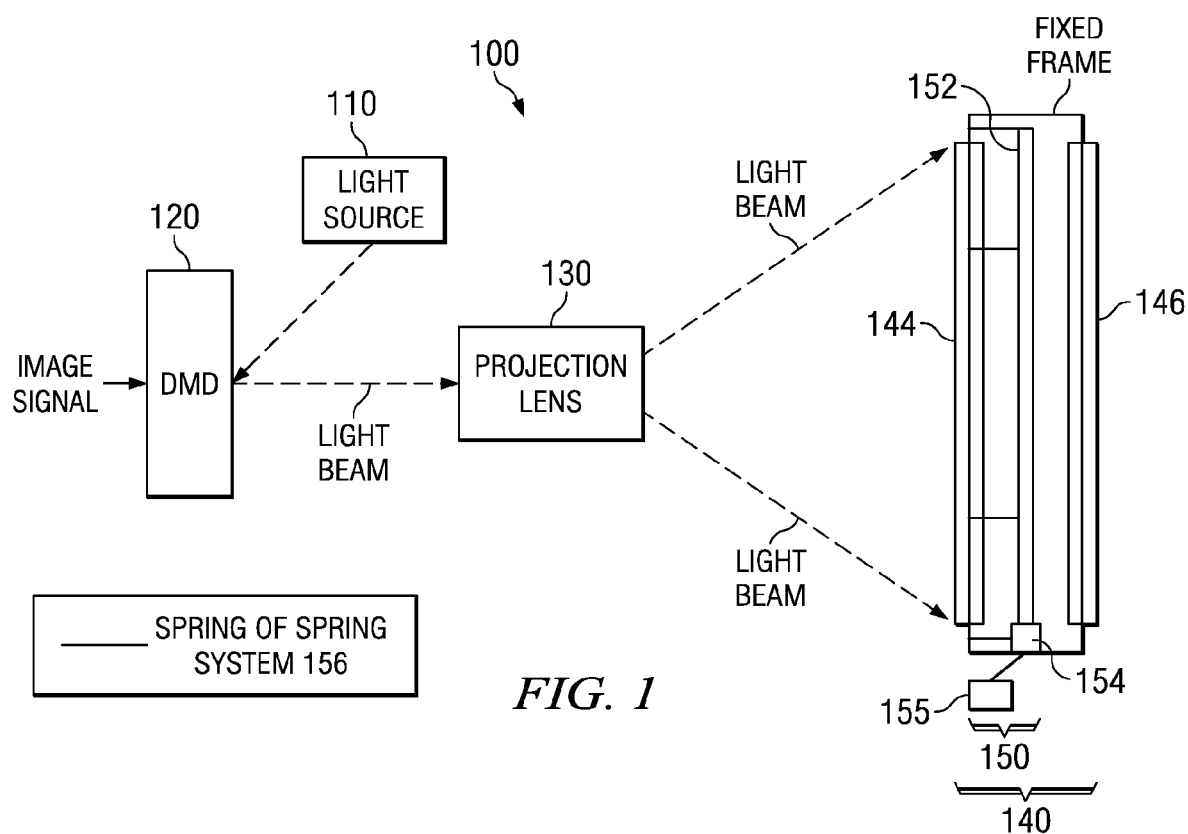

SYSTEM AND METHOD FOR REDUCING VISIBLE SPECKLE IN A PROJECTION VISUAL DISPLAY SYSTEM

CROSS-REFERENCE TO PROVISIONAL APPLICATION

This application claims the benefit of U.S. Provisional Application Ser. No. 60/947,640, filed on Jul. 2, 2007, and incorporated herein by reference in its entirety.

TECHNICAL FIELD OF THE INVENTION

The invention is directed, in general, to projection visual display (PVD) systems and, more specifically, to a system and method employing a diffuser that moves the diffuser in a particular manner to reduce visible speckle that may be evident in such systems.

BACKGROUND OF THE INVENTION

Televisions and other types of imaging systems are pervasive in today's society. Recent years have seen the introduction of higher definition imaging systems. Engineers continue to try to increase the resolution and brightness of imaging systems to provide better picture quality, but also face constraints associated with providing such increased resolution and brightness.

For example, to increase brightness in PVD systems, coherent light sources such as lasers may be used in the place of incoherent light sources such as light-emitting-diodes (LEDs) and incandescent or fluorescent lamps. However, while coherent light sources may increase the brightness of the PVD system, such light sources often produce images having a noticeable granularity. This grainy pattern, also known as speckle or the scintillation effect, arises due to the highly narrowband and polarized nature of the coherent light incident on a diffuse surface.

Speckle has been attributed to the fact that coherent light reflected by or through a diffuser produces a complex, random, but stationary diffraction pattern. Specifically, speckle originates when the coherent plane phase front from a laser scatters within a medium with optical path length differences that are less than or equal to the coherence length of the laser. Speckle scattering optical material is used in projection displays at the screen in order to expand the viewing angle. Within the illumination system scattering or diffusing material is needed to distribute the light over the area of the spatial light modulator. Speckle can also rise from path length differences as a result of surface roughness, scratches, digs and polishing imperfections in optical elements.

SUMMARY OF THE INVENTION

To address the above-discussed deficiencies of the prior art, one aspect of the invention provides an apparatus for reducing visible speckle in a PVD system. In one embodiment, the apparatus includes a diffuser interposable in an optical path of a PVD system and a diffuser actuator having a single drive axis configured to cause the diffuser to travel in a lissajous curve at least partially transverse to the optical path.

In another aspect, the invention provides a method of reducing visible speckle in a PVD system. In one embodiment, the method includes interposing a diffuser in an optical path of the PVD system and applying a force along a single drive axis to cause the diffuser to travel in a lissajous curve at least partially transverse to the optical path.

In yet another aspect, the invention provides a PVD system. In one embodiment, the system includes: a light modulator configured to generate real-time images from an input image signal, a screen configured to display the images and a projection lens configured to project the images from the light modulator onto the screen. The screen has an apparatus for reducing visible speckle in the PVD system, including: a diffuser interposed in an optical path of the projection visual display system, a spring system coupled to the diffuser and a fixed member of the PVD system, and a diffuser actuator having a single drive axis and configured to cause the diffuser to travel in a lissajous curve at least partially transverse to the optical path.

In still yet another aspect, the disclosure provides another embodiment of an apparatus for reducing visible speckle in a PVD system. In this embodiment, the apparatus includes a diffuser interposable in an intermediate image plane of an optical path of the PVD system, a spring coupled to the diffuser and a diffuser actuator coupled to the spring and configured to apply a force to the spring along a single drive axis that is offset from a center of mass of the diffuser and cause the diffuser to travel in a lissajous curve at least partially transverse to the optical path.

BRIEF DESCRIPTION OF THE DRAWINGS

For a more complete understanding of the invention, reference is now made to the following descriptions taken in conjunction with the accompanying drawings, in which:

FIG. 1 illustrates an embodiment of a PVD system constructed according to the principles of the invention;

FIG. 2 illustrates an embodiment of an apparatus for reducing visible speckle in a PVD system constructed according to the principles of the invention;

DETAILED DESCRIPTION

In general, a diffuser traveling in a lissajous curve in response to a force exerted thereon along a single axis (single drive axis) is provided to reduce visible speckle. The diffuser will not stop, even instantaneously, as long as the diffuser actuator is being driven since the resonant frequencies of the two axes of motion of the lissajous curve are at an integer ratio and remain commensurate over time. The phases of the two axes are independently controlled since they are at different frequencies.

Figure 5:
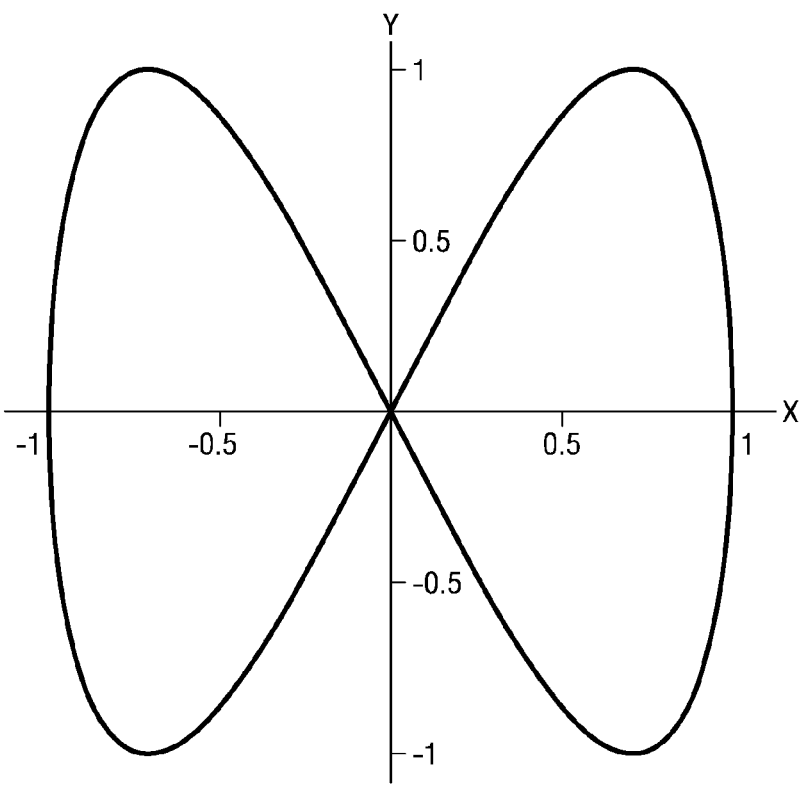
FIG. 5 illustrates a lissajous pattern representing the motion of the diffusers.

To reduce visible speckle, one embodiment of the invention calls for a moving low-angle diffuser to be placed in the optical path (i.e., at the display screen) or at an image plane in the optical path of a PVD system, such as a television or cell phone. The optical path is the path of a light beam, used for generating an image in a PVD system, as the light beam travels through the PVD. The diffuser may be coupled with a single-axis drive mechanism (a diffuser actuator) through a spring system that uses, for example, cantilever springs, leaf springs or an s-folded metal spring. The spring system is designed to allow the diffuser to travel in a lissajous curve having two low frequency modes of vibration in the plane perpendicular or substantially perpendicular to the axis of the optical path. In the illustrated embodiment, the two modes in the lissajous curve move exactly or substantially perpendicular to one other. In the illustrated embodiment, the modes are designed to resonate in the range of 3-300 Hz and have a frequency ratio at (or about) a low value, such as 2, 3, or 3/2. An integer ratio different from 1 is desirable due to the need to control the relative phase of the diffuser. In some embodiments, the center of mass of the diffuser and the spring are offset from the drive axis of the diffuser actuator. In other embodiments, the single drive axis is aligned with the center of mass of the diffuser and is oriented to drive both modes. FIG. 5 illustrates a lissajous pattern, having a frequency ratio of 2:1, in which a diffuser will travel.

The diffuser actuator is controlled by an electrical signal (drive signal) which consists of the sum of the two resonant frequencies of the lissajous curve. A look-up table may be used to determine the appropriate drive signal to be applied based on the resonant frequencies. Both resonances are simultaneously excited in response to the force provided by the diffuser actuator. The amplitude of the two signals is chosen to provide an adequate number of uncorrelated speckle patterns. The relative amplitude and phase of the two drive waveforms is chosen so that the minimum diffuser velocity is as large as possible, and always greater than zero. The phase relationship is fixed over a complete cycle because of the rational number frequency ratio of the two modes. Ideally the mechanical Q of the modes is in the range of 5-20. A higher Q provides more motion with less drive, but will allow more phase shift and amplitude change if the resonance frequency changes over time or due to environmental factors.

FIG. 1 illustrates an embodiment of a PVD system 100 including a light source 110, a light modulator, represented by a Digital Micromirror Device (DMD) 120, a projection lens 130 and a display screen 140. The display screen 140 includes an apparatus 150 for reducing visible speckle in the PVD system 100. The PVD system 100 may include additional components commonly employed in a conventional PVD system that are not illustrated or discussed herein for simplicity's sake.

The light source 110 generates a light beam onto the DMD 120. Typically the light source 110 is a laser or lasers that generate a coherent light beam onto the DMD 120. Alternatively, an LED, arc lamp, or halogen lamp may be used as a light source. The light beam from the light source 110 is reflected off the DMD 120 and through the projecting lens 130 which causes the light beam to be deflected in a predetermined pattern to form an image on the display screen 140. The light source 110, the DMD 120 and the projection lens 130 may be conventional components typically used in a rear projection visual display system.

The display screen 140 includes a first transparent substrate 144, for example a planar sheet of glass or plastic. The display screen also includes a second substrate 146, which may be similar to the first substrate 144. In rear projection display embodiments, the first substrate 144 may include a Fresnel lens, and the second substrate 146 may include a lenticular array. A Fresnel lens as incorporated in certain rear projection display systems collimates light resulting in a substantially parallel light beam. A lenticular array typically includes an array of small, cylindrical lenses that are vertically disposed to expand the light to the viewer in the horizontal direction. The expansion of the incoming projected light in the vertical dimension, for observation by the viewer, is carried out by including an appropriate amount of optical diffusion in the Fresnel lens, the lenticular array, or a combination thereof. Alternatively, the same functionality as the lenticular array may be achieved by either waveguides, or beads, or holographic elements to essentially achieve the same effect, i.e., to disperse light towards the viewer and produce a desired viewing angle for the display.

The DMD 120 is a light modulator that employs the light beam to generate real-time images from an input image signal. The input image signal may be an analog or digital signal from a television tuner, Motion Picture Experts Group (MPEG) decoder, video disc player, video cassette player, personal computer (PC) graphics card or the like. The input image signal is received and processed in a conventional manner to direct the DMD 120 to generate the images.

The apparatus 150 includes a diffuser 152, a diffuser actuator 154, a drive controller 155 and a spring system 156. The diffuser 152 may be a low-angle diffuser that changes the speckle pattern viewed on the second substrate 146 by varying the polarization and/or the phase and amplitude of light diffused at different angles as the diffuser 152 is moved. The width and height of the diffuser 152 may be based on the size of the first substrate 144 and/or the second substrate 146. Thus, unlike conventional rotating diffusers, the diffuser 152 does not have to be larger (sometimes three times larger) than the light beam size along the optical path of the PVD system 100. The diffuser 152 is a 2° diffuser. However, other low-angle diffusers may be used, including 3°-5° diffusers.

The diffuser 152 is positioned at or substantially at an image plane of the optical path of the PVD system 100. In the PVD system 100, the diffuser 152 is located between the first substrate 144 and the second substrate 146 and is attached to a fixed member (e.g., the frame) of the PVD system 100 via the spring system 156. The diffuser 152 may be positioned 2 mm from the first substrate 144 and 2 mm from the second substrate 146. Instead of directly attached to a frame, some embodiments call for the diffuser 152 to be attached to a component, such as the first substrate 144, that is fixed to the frame. As such, the first substrate 144 would also move as the diffuser 152 is moved. The diffuser 152 could be laminated to the first substrate 144. Instead of being positioned at the display screen 140 as illustrated, the diffuser 152 may be located at another image plane in the optical path. If located near a stop, the diffuser 152 can be combined with a stationary diffuser to increase the effectiveness.

The diffuser 152 is moved by the diffuser actuator 154. The diffuser actuator 154 moves the diffuser 152 by resonant vibration on the spring system 156 in a lissajous curve. A lissajous curve represents two modes of motion according to sine waves at two different frequencies. The resonant frequencies of the two modes have a low value integer ratio therebetween that is a rational number. For example, the integer ratio between the two modes may be 1:2, 1:3, 2:3, 3:4, etc. The motions of the modes are approximately orthogonal and occur in a plane that is at least partially transverse to the optical path of the PVD system 100. At the display screen 140, the optical path is perpendicular or substantially perpendicular to the viewing plane of the display screen 140.

Figure 3:
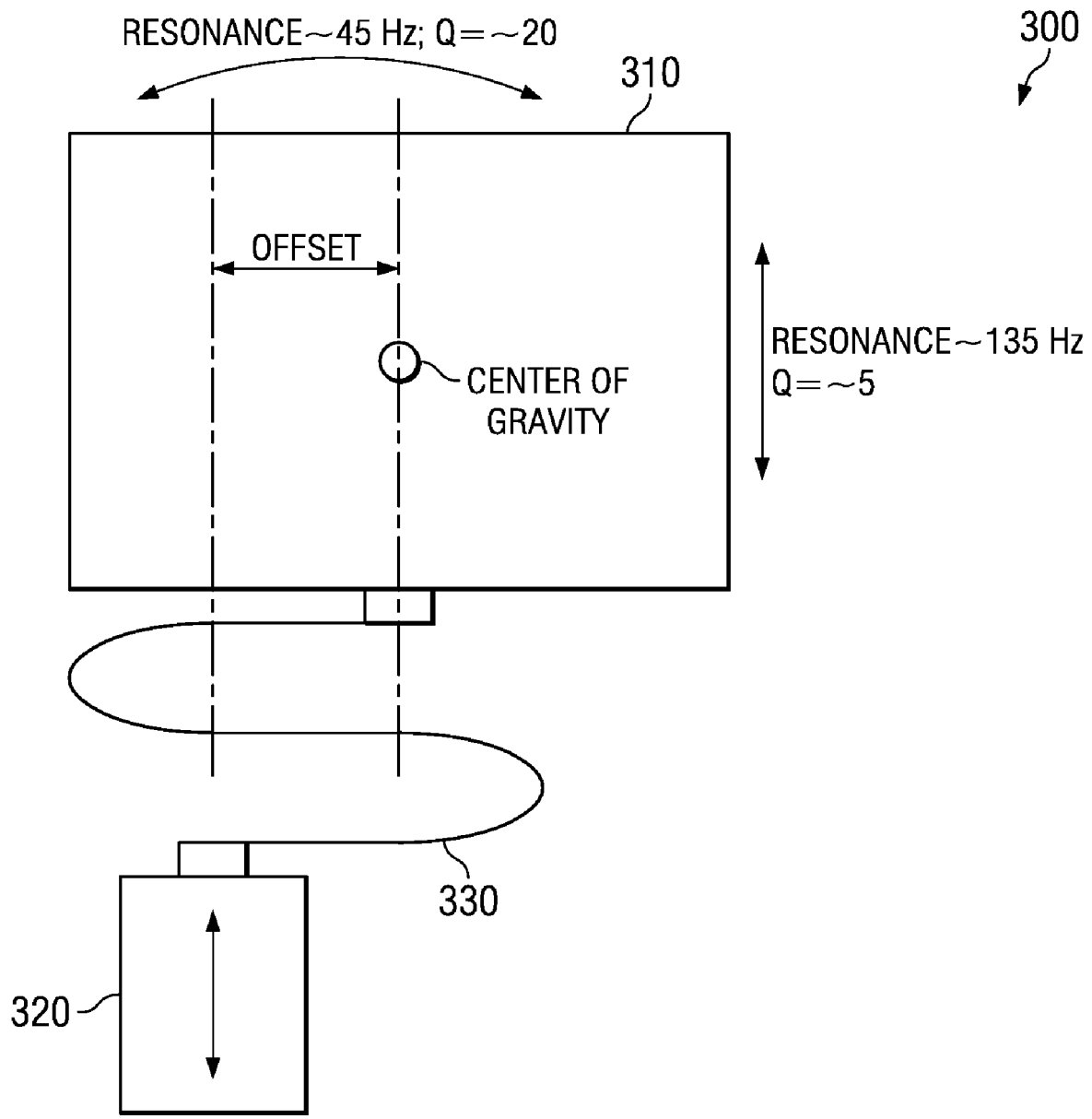
FIG. 3 illustrates another embodiment of an apparatus for reducing visible speckle in a PVD system constructed according to the principles of the invention.

The diffuser actuator 154 may be a voice coil that provides a force on a single drive axis to cause the diffuser 152 to move in the lissajous curve. The diffuser actuator 154 is obtusely oriented with respect to the two axes of motion of the lissajous curve. FIG. 2 further illustrates positioning of a diffuser actuator with respect to a diffuser. As illustrated in FIG. 3, a de-speckling apparatus may also include a diffuser actuator that has a drive axis offset from the center of mass of a diffuser.

Besides a voice coil, the diffuser actuator 154 may be another electromagnetic actuator or another type of actuator, such as, an electrostatic actuator or a piezoelectric actuator. The diffuser actuator 154 may also be a thermal actuator that uses the coefficient of thermal expansion to achieve motion. The diffuser actuator 154 is sized to move the diffuser 152 at a rate in the range of about 8-25 mm/s. As such, the subjective-speckle contrast viewed at the second substrate 146 should be reduced to an acceptable speckle of scintillation level of 4%. A 2° diffuser moving at about 15 mm/s relative to a lenticular array spaced approximately 2 mm away is sufficient to reduce subjective-speckle contrast to acceptable levels.

The diffuser actuator 154 may be controlled by a drive controller 155 configured to generate electrical signals (drive signals) to control the diffuser actuator 154. The drive controller 155 may include a microprocessor and an associated memory having a look-up table that includes the frequencies or frequency ratios associated with the lissajous curve and the appropriate force needed to be applied to the diffuser 152. The appropriate force associated with each of the frequencies or frequency ratios is predetermined based on parameters of the apparatus 150 including (but not limited to): the diffuser actuator 154, the spring system 156, weight of the diffuser 152, etc., and stored in the look-up table. The microprocessor may read the data from the look-up table and provide the data to a digital-to-analog converter to drive the diffuser actuator 154. In some embodiments, the drive controller 155 may generate analog drive signals wherein a digital-to-analog converter is not needed.

The spring system 156 is configured to cooperate with diffuser actuator 154 to cause the diffuser 152 to travel in the lissajous curve. The spring system 156 includes multiple cantilever springs that are mounted to a fixed member of the PVD system 100 and to the diffuser 152. Other type of springs, such as leaf springs, may be used in the spring system. Cantilever springs, however, may provide improved reduction of undesired coupling between x and y axes compared to leaf springs.

The cantilever springs are positioned around the perimeter of the diffuser 152 and are aligned in the z-axis with one end attached securely to a non-moving chassis member of the PVD system 100 and the other end attached securely to the diffuser 152. Typically, the number of springs and the positioning thereof are arranged to provide a corresponding opposing force. Additionally, the number of springs employed and the location in the spring system 156 depend on such factors as, the embodiment, the type of springs used, the weight of the diffuser, etc.

The springs may be rectangular cross section rods attached to the fixed member that allow the desired spring/mass resonant motion in the X and Y axes of the diffuser 152 but prevent any Z axis motion from occurring because of the stiffness of the rod in the Z axis direction. The rectangular rods may be stiffer or thicker in one axis to achieve the desired resonant frequency ratio. The resonant frequency of the diffuser 152 is set by the combined spring rate in each axis of all the springs in the spring system 156 and the mass of the diffuser 152.

FIG. 2 illustrates an embodiment of an apparatus 200 for reducing visible speckle in a PVD system, such as in FIG. 1, constructed according to the principles of the invention. The apparatus 200 includes a diffuser 210 interposable in an optical path of the PVD system 200, a diffuser actuator 220 configured to cause the diffuser to travel in a lissajous curve at least partially transverse to the optical path and a spring system 230 configured to cooperate with the diffuser actuator 220 to cause the diffuser 210 to travel in the lissajous curve.

The diffuser 210 may be a low angle, conventional diffuser positioned substantially at an image plane in the optical path of the PVD system. For example, the diffuser 210 may be positioned at the display screen of the PVD system as in FIG. 1. In other embodiments, the diffuser 210 may be positioned an intermediate image plane along the optical path.

The diffuser actuator 220 may be positioned at or about at a 45 degree angle between the x and y axis of the diffuser 210. The diffuser actuator 220 applies a force along a single drive axis that traverses from a first corner to an opposite corner of the diffuser 210 through the center of gravity thereof. Though FIG. 2 shows the diffuser actuator 220 at the lower left hand corner of the diffuser 210, the diffuser actuator 220 could also be located at any of the other corners of the diffuser 210. The diffuser actuator 220 provides a force along the drive axis to cause the diffuser 210 to move in a lissajous curve. The force is sufficient to cause the diffuser 210 to vibrate in a range of about 8-25 mm/sec. As the diffuser 210 travels in the lissajous curve, the velocity is changing but is always greater than zero. This differs from conventional moving diffusers that move in a circle at a constant velocity. The diffuser actuator 220 may be a conventional electromagnetic actuator, an electrostatic actuator, a piezoelectric actuator or a thermal actuator. A diffuser controller, not shown, may be used to drive the diffuser actuator 220.

The spring system 230 provides support for the diffuser 210 and attaches the diffuser 210 to a fixed frame of the PVD system. The spring system 230 may employ cantilever springs, leaf springs or another type of spring to couple the diffuser 210 to the fixed frame. The springs may be mechanically coupled to a frame of the diffuser 210 using, for example, screws. Screws may also be used to couple the springs to the fixed frame. The springs may have a rectangular cross section with a stiffer vertical axis compared to the horizontal axis to provide more vertical support to prevent sag due to the weight of the diffuser 210.

FIG. 3 illustrates another embodiment of an apparatus 300 for reducing visible speckle in a projection visual display system constructed according to the principles of the invention. The apparatus 300 includes a diffuser 310, a diffuser actuator 320 and a spring system 330. Unlike FIG. 1, the diffuser 310 is located within the illumination system of the PVD, prior to the spatial light modulator. The motion of the diffuser 310 reduces the visible speckle created by expanding the light source to fill the area and numerical aperture of the spatial light modulator. The diffuser 310 may be placed at or about at an image plane of the illumination source of the PVD which is imaged onto the spatial light modulator. In this case the diffusion angle range of the diffuser 310 would determine the numerical aperture of the light at the spatial light modulator.

The diffuser 310 may also be used at other locations in the PVD optical system, especially if combined with other diffusers, lenslet arrays, or diffractive optical elements. For example, in one embodiment the diffuser 310 may be located immediately after the lasers (i.e., light source) of the PVD system. In this design, the moving diffuser 310 may be very small, just slightly larger than its motion range. For example, the diffuser 310 may have a width or height of 10 mm or approximately 10 mm.

The diffuser 310 can be used to expand the laser beams into a cone of light that illuminates and is collimated by a lens onto a lenticular array. The lenticular array and a lens following it distribute the light evenly over the spatial light modulator area. This low speckle illumination system, which includes the apparatus 300 along with the two lenses and the lenticular array, can be reduced to several cubic centimeters in size allowing it to be used in ultraportable projectors which may be built into cell phones.

Thus, in some embodiments, the diffuser 310 may be a one degree diffuser and be positioned at an image plane after the light source and before the light modulator (e.g., a DMD) of a PVD system. As such, instead of located at an image plane associated with a display screen as in FIG. 1, the diffuser 310 can be located at an intermediate image plane of the optical path of the PVD system. In yet another embodiment, the diffuser may be interposed in the optical path at an intermediate image plane in a front projection system.

The diffuser actuator 320 is a piezoelectric actuator that moves the piston along a single drive axis as illustrated in FIG. 3. Another type of actuator, such as a voice coil, may also be used. The diffuser actuator 320 causes the diffuser 310 to travel in a lissajous curve with a frequency ratio that is a low value, integer ratio.

The diffuser actuator 320 may be driven by a diffuser controller (not shown) that provides a drive signal that is a superposition of the two resonant frequencies along the x and y axes of the diffuser 310. The drive signal, for example, may be the sum of 45 Hz and 90 (or 135) Hz sine waves wherein the 45 Hz represent resonance along the x axis and the 90 Hz represents resonance along the y axis. The phase relationship of the lissajous curve is selected to insure that the diffuser 310 does not reach zero velocity as it moves. Resonance along the x axis may be represented by a Q factor of 20 while resonance along the y axis may be represented by a Q factor of 5.

The single drive axis of the diffuser actuator 320 is offset from the center of mass of the diffuser 310. As such, the diffuser actuator 320 provides an indirect drive along the x axis of the diffuser. Inertia is used to couple the force provided by the diffuser actuator 320 to motion along the x axis. The diffuser actuator 320 may cause the diffuser 310 to move at a rate of 8-25 mm/s.

The spring system 330 is an s-folded sheet metal strip spring. The spring system 330 is sized to support the weight of the diffuser 310. As the diffuser actuator 320 provides a vertical force, the spring system 330 moves in two low frequency modes causing the first "U" and the second "U" of the spring system 330 to move in phase or move 180 degrees out of phase. The diffuser 310, diffuser actuator 320 and the spring system 330 may be coupled together via conventional means.

Figure 4:
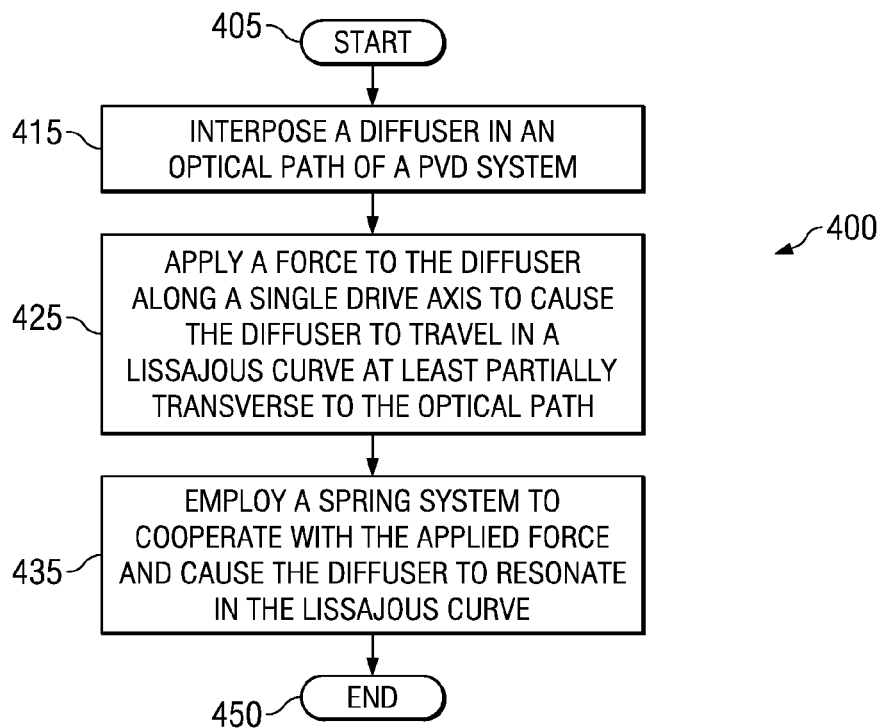
FIG. 4 illustrates an embodiment of a method of reducing visible speckle in a PVD system carried out according to the principles of the invention.

FIG. 4 illustrates an embodiment of a method 400 of reducing visible speckle in a PVD system carried out according to the principles of the invention. The method 400 begins in a step 405, wherein it is desired to reduce visible speckle.

In a step 415, a diffuser is interposed in an optical path of the PVD system. The diffuser may be positioned at an image plane or approximately at an image plane of the optical path. In one embodiment, the diffuser may be positioned approximate to a display screen of the PVD system.

After interposing the diffuser, a force is applied to the diffuser along a single drive axis causing the diffuser to travel in a lissajous curve at least partially transverse to the optical path in a step 425. In one embodiment, a diffuser actuator with a single drive axis is used to apply the force. The single drive axis diffuser actuator may be positioned at approximately 45 degrees with respect to the two axes of motion of the lissajous curve. In some embodiments, the single drive axis is offset from the center of mass of the diffuser.

After applying the force, a spring system cooperates with the applied force to cause the diffuser to resonate in the lissajous curve in a step 435. In one embodiment, the lissajous curve has a frequency ratio that is a rational number. The diffuser continues to travel in the lissajous curve as long as the force is applied. Thus, for example, as long as the drive signal is applied to the diffuser actuator (e.g., the PVD system is turned-on) the diffuser will travel in the lissajous curve. Thereafter, the method 400 ends in a step 450.

Those skilled in the art to which the invention relates will appreciate that other and further additions, deletions, substitutions and modifications may be made to the described embodiments without departing from the scope of the invention.

What is claimed is:

1. An apparatus for reducing visible speckle in a projection visual display system, comprising:
    a diffuser interposable in an optical path of said projection visual display system; and
    a diffuser actuator with a single drive axis configured to cause said diffuser to travel in a Lissajous curve at least partially transverse to said optical path.

2. The apparatus as recited in claim 1 wherein said diffuser is positioned substantially at an image plane in said optical path.

3. The apparatus as recited in claim 1 wherein said diffuser actuator is selected from the group consisting of:
    an electromagnetic actuator,
    an electrostatic actuator,
    a piezoelectric actuator, and
    a thermal actuator.

4. The apparatus as recited in claim 1 wherein said Lissajous curve has a frequency ratio that is a rational number.

5. The apparatus as recited in claim 1 further comprising at least one spring configured to cooperate with said diffuser actuator to cause said diffuser to travel in said Lissajous curve.

6. The apparatus as recited in claim 1 wherein said Lissajous curve has two axes of motion and said single drive axis is obtusely oriented with respect to both of said axes.

7. The apparatus as recited in claim 6 wherein said single drive axis does not traverse through the center of mass of said diffuser.

8. An apparatus for reducing visible speckle in a projection visual display system, comprising:
    a diffuser interposable in an intermediate image plane of an optical path of said projection visual display system;
    a spring coupled to said diffuser; and
    a diffuser actuator coupled to said spring and configured to apply a force to said spring along a single drive axis that is offset from a center of mass of said diffuser to cause said diffuser to travel in a Lissajous curve at least partially transverse to said optical path.

9. The apparatus as recited in claim 8 wherein said intermediate image plane is located between a light source and a light modulator of said projection visual display system.

* * * * *